G. J. MEYER.
LOADER FOR BOTTLE WASHERS.
APPLICATION FILED JUNE 9, 1919.

1,345,617.   Patented July 6, 1920.

WITNESSES.
H. D. Chase
C. L. Waal

INVENTOR
George J. Meyer
By R. C. Caldwell
ATTORNEY.

UNITED STATES PATENT OFFICE.

GEORGE J. MEYER, OF MILWAUKEE, WISCONSIN, ASSIGNOR TO GEO. J. MEYER MANUFACTURING COMPANY, OF MILWAUKEE, WISCONSIN, A CORPORATION OF WISCONSIN.

LOADER FOR BOTTLE-WASHERS.

1,345,617.   Specification of Letters Patent.   Patented July 6, 1920.

Original application filed November 22, 1915, Serial No. 62,706. Divided and this application filed June 9, 1919. Serial No. 302,881.

*To all whom it may concern:*

Be it known that I, GEORGE J. MEYER, a citizen of the United States, and resident of Milwaukee, Milwaukee county, Wisconsin, have invented new and useful Improvements in Loaders for Bottle-Washers, of which the following is a description, reference being had to the accompanying drawings, which are a part of this specification.

This invention has for its object to provide a bottle washing machine of the type in which the bottle conveyer is given continuous traveling motion, and the washing and brushing mechanism is given a reciprocating travel to coöperate with the bottles successively while the latter are traveling, such type of bottle washer being exemplified by Patent No. 1,095,290 to Daniel Schmidt, dated May 5, 1914.

Another object of the invention is to provide such a bottle washing machine with an automatic loading chute which will be adapted to receive bottles from a conveyer of a soaker or the like, and will invert the bottles and insert them in the openings of the bottle carriers of the machine.

Another object of the invention is to perfect details of construction of such a machine generally.

This application is a continuation and division of, that is contains subject matter taken from, my co-pending application, Serial No. 62,706, filed Nov. 22, 1915, patented July 15, 1919, No. 1,310,128 for bottle washing machine.

With the above and other objects in view the invention consists in the loader for bottle washers as herein claimed and all equivalents.

Referring to the accompanying drawings in which like characters of reference indicate the same parts in different views.

Figure 1:
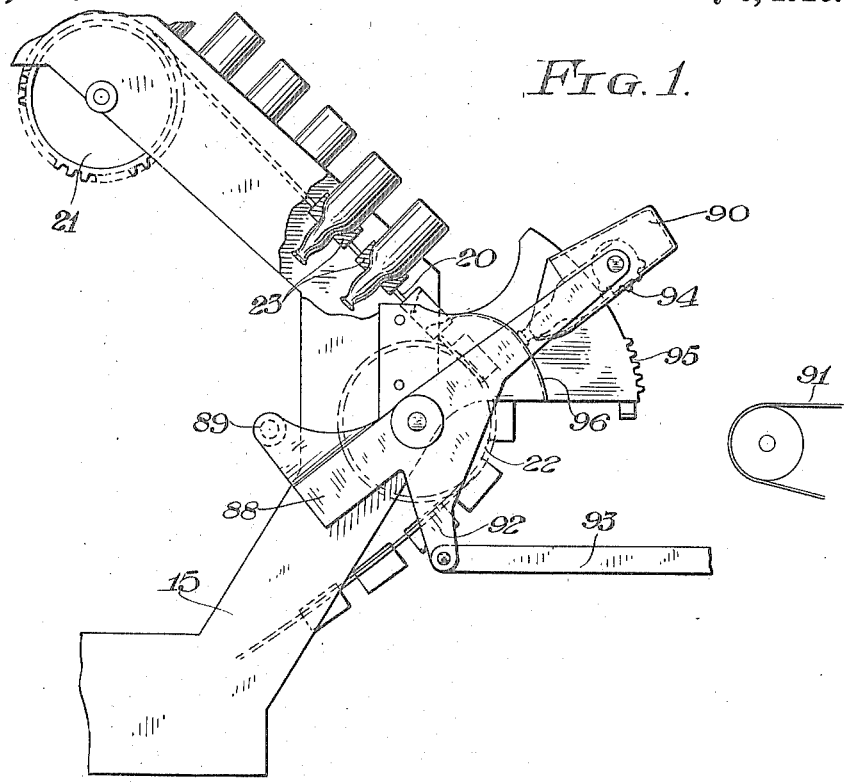
Figure 1 is a side view of a loader for bottle washers constructed in accordance with this invention and showing the loading mechanism in an intermediate position.
Figure 2:
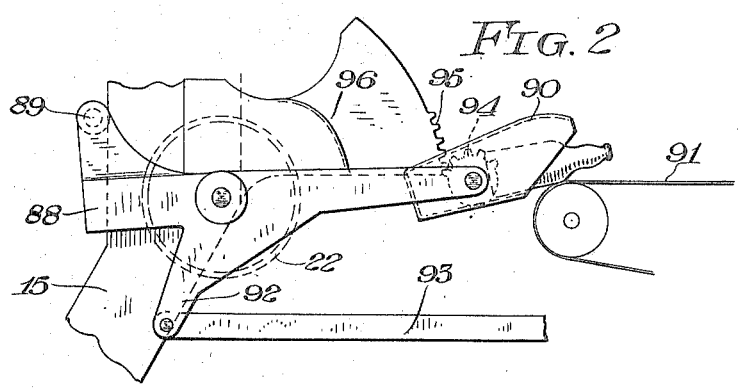
Fig. 2 is a similar view thereof with the loading mechanism in position to receive bottles from the feeding conveyer.

In these drawings 15 indicates a frame of a bottle washing machine or the like, the front or loading end only being shown, in which are suitably journaled sprocket wheels 21 and 22 supporting a chain conveyer 20. This chain conveyer has the links of the chain members thereof connected by wooden cross strips 23 forming bottle carriers having tapering openings to receive the necks of the bottles so that the bottles are carried thereby in an inverted position.

At this front end of the machine an automatic loader is provided which is adapted to receive the bottles from a conveyer such as the belt conveyer of a soaker and then invert them and deposit them in the openings of the bottle carriers in the ascending flight of the bottle conveyer from sprocket wheels 22 to sprocket wheels 21. This loading mechanism comprises side frames 88 pivotally mounted concentric with the sprockets 22 of the conveyer, preferably on the same shaft therewith and connected at their rear ends by a counterweight 89. A reversible chute 90 is pivotally mounted at the outer ends of the side frames 88 and is divided by partitions into pockets to receive and hold the bottles from the time they are discharged by the bottle delivery conveyer 91 until they are inverted and deposited in the openings of the bottle carriers 23. The swinging movement of the loader is provided by an arm 92 on one of the side frames 88 having a connection 93 with the driving mechanism of the soaker or other mechanism of which the conveyer 91 is a part, so that the operation of the loader will be properly timed with relation to the operation of the delivery conveyer 91. The operation of the loader is also in synchronism with the operation of the bottle washing machine, the latter being driven from the soaker-operating mechanism for this purpose. A pinion 94 is provided on one end of the loading chute 90 to engage teeth of a stationary segmental rack 95 for inverting the loading chute at the beginning of its upward movement, and an arc-shaped stationary guide plate 96 has the necks of the bottles bear thereon when the chute is inverted and until it completes its swinging movement by carrying the bottles off of said guide plate, to drop them into the openings in the carriers 23. When this is done the loader is returned to its position for receiving the next row of bottles from the conveyer 91, and just before completing such movement the pinion 94 reëngages the teeth of the segmental rack 95 and restores the chute to its position for receiving the bottles,

What I claim as new and desire to secure by Letters Patent is:

1. In a bottle washing machine having a traveling bottle conveyer, a swinging frame, a bottle chute pivotally mounted on the swinging frame and forming pockets to receive the bottles in the lower position of the swinging frame, means for inverting the chute during the movement of the swinging frame, a guide for preventing the bottles falling out of the inverted chute until in position for delivery to the conveyer, and means for swinging the frame.

2. In a bottle washing machine having a traveling bottle conveyer, a swinging frame, a bottle chute pivotally mounted on the swinging frame and forming pockets to receive the bottles in the lower position of the swinging frame, a pinion on the bottle chute, a stationary segmental rack in the path of the pinion for inverting the chute during the movement of the swinging frame, a guide for preventing the bottles from falling out of the inverted chute until in position for delivery to the conveyer, and means for swinging the frame.

In testimony whereof, I affix my signature, in presence of two witnesses.

GEORGE J. MEYER.

Witnesses:
R. S. CALDWELL,
H. D. CHASE.